United States Patent

[11] 3,620,782

[72] Inventors  Robert N. McNally
               Corning, N.Y.;
               Robert F. Patrick, Louisville, Ky.
[21] Appl. No. 16,252
[22] Filed     Mar. 3, 1970
[45] Patented  Nov. 16, 1971
[73] Assignee  Corhart Refractories Company
               Louisville, Ky.
               Continuation-in-part of 655,273, July
               24, 1967, now abandoned.

[54] MANUFACTURE OF FUSED CAST BASIC
     REFRACTORY
     8 Claims, No Drawings
[52] U.S. Cl. .................................................. 106/59
[51] Int. Cl. ........................................... C04b 35/42
[50] Field of Search ..................................... 106/59

[56]             References Cited
           UNITED STATES PATENTS
3,342,616   9/1967   Alper et al. .................... 106/59

Primary Examiner—James E. Poer
Attorneys—Clarence R. Patty, Jr. and Richard N. Wardell ABSTRACT: Method for preventing or ikhibiting hydration cracking or disintegration of fused cast basic refractory made from a mixture consisting essentially of magnesia and chrome ore, which has an oxide analysis, by weight, or at least 40% MgO, at least 12% $Cr_2O_3$, at least 5% $Al_2O_3$, at least 3% FeO, up to 3% CaO, up to 5% $SiO_2$, up to 10% $TiO_2$, up 3% fluorine, and in which the total of MgO + $Cr_2O_3$ + $Al_2O_3$ + FeO is at least 82%, wherein 0.5 to 5 wt. percent (based on the total weight of the basic refractory ingredients) of at least one oxygen-containing compound of sodium and/or potassium is added to and mixed with the basic refractory batch materials. The compound can be a carbonate, phosphate, silicate and/or sulfate. Batch materials are then melted and cast into preformed molds in the usual manner to form solidified monolithic fused cast articles or bodies.

MANUFACTURE OF FUSED CAST BASIC REFRACTORY

This is a continuation-in-part of application Ser. No. 655,273, filed July 24, 1967, now abandoned.

BACKGROUND OF THE INVENTION

This invention pertains to the manufacture of fused cast basic refractory articles or blocks which are suitable for, inter alia, linings of furnaces employed in basic steelmaking processes. Of particular concern at the present time are such fused cast blocks made from batch mixtures of magnesia and chrome ore providing compositions with principal crystalline phases of periclase (with other oxide components in solid solution therewith) and chromium-containing spinel as set forth in U.S. Pat. Nos. 2,599,566, 2,690,974, 3,132,954 and 3,198,643. These refractory articles desirably contain at least 40 weight percent MgO, at least 12 weight percent $Cr_2O_3$, at least 5 weight percent $Al_2O_3$, at least 3 weight percent FeO, and a total of these four mentioned oxides amounting to at least 82 weight percent.

While the dense, tightly bonded fused structure of fused cast basic refractory provides a greater measure of resistance to hydration cracking and/or deterioration than is found in many unfused refractories of similar basic compositions, nevertheless it has been found from production experience that such greater measure of resistance is not sufficient to provide satisfactory economical recovery of saleable product from the total lot of blocks cast, nor sufficient to avoid undesirable cracking and/or deterioration during usual time periods of inventory storage and shipment prior to installation in furnaces. Even where cracking is not severe enough to render the product unusable, it can significantly shorten the service life of the refractory. Such resistance has been found to be quite erratic, and the problem is accentuated during the warm months of the year. The problem is rendered more acute in more common situation where the refractory bodies are cast as large billets and then sawed into appropriate shaped refractory articles. Necessarily the sawing must be done with a diamond tipped blade with cooling water flowed onto at least the portion of the block being cut and on the diamond tipped blade.

SUMMARY OF THE INVENTION

It has now been discovered that hydration cracking and/or deterioration of fused cast basic refractory articles having an oxide analysis, by weight, of at least 40% MgO, at least 12% $Cr_2O_3$, at least 5% $Al_2O_3$, at least 3% FeO, up to 3% CaO, up to 5% $SiO_2$, up to 10% $TiO_2$, up to 3 percent fluorine, and in which the total of $MgO+Cr_2O_3+Al_2O_3+FeO$ is at least 82 percent, can be greatly inhibited and substantially eliminated by adding to a mixture of basic refractory raw material consisting essentially of magnesia and chrome ore 0.5 to 5 weight percent (preferably 1 to 3 weight percent), based on the total weight of the basic refractory raw material, of at least one oxygen-containing compound of sodium and/or potassium, and mixing this added substance with the raw material mixture prior to melting. Then the manufacturing process is continued in the usual manner by melting the mixture, pouring the melted mixture into molds and solidifying the melted mixture to form monolithic articles having substantially the shape of the mold cavity. While it may be likely that much of the compound addition is volatilized off during melting, nevertheless such addition is found to leave a lasting effect of increased inhibition to hydration cracking and/or deterioration in the solidified articles.

This compound addition has been found particularly effective for inhibiting adverse effects of hydration in basic fused cast articles having an analytical composition as defined above (made from raw material mixtures of magnesia and chrome ore having substantially the same oxide analysis). These articles were found to have two or more times the resistance to hydration, when immersed in boiling water, with 1 to 3 weight percent compound additions than similar products made without any compound addition.

Among the oxygen-containing compounds of sodium and/or potassium (both metals hereinafter referred to as M) suitable in the process of this invention are carbonates, phosphates, silicates and sulfates. The regular carbonates ($M_2CO_3$) are most preferred. However, bicarbonates can also be used and are included within the term "carbonate" herein. Particularly suitable phosphates are those with $M_2O \cdot P_2O_5$ ranging from 1:1 to 3:1. Any of the usual silicates can be employed, with include those with $M_2O \cdot SiO_2$ ranging from 2:1 to 1:4. Of the sulfates, the regular sulfates ($M_2SO_4$) are preferred, but thiosulfates are also suitable and are included within the term "sulfate" herein.

The most preferred composition area with which to employ the present invention is the basic refractory material oxide analysis, by weight, of 45–60% MgO, 12–25% $Cr_2O_3$, 5–25% $Al_2O_3$, 5–15% FeO, less than 2% CaO, less than 2% $SiO_2$, up to 3% $TiO_2$ and up to 1 percent fluorine, where the total of $Mg+Cr_2O+Al_2O_3+FeO$ is at least 95 percent.

DESCRIPTION OF THE PREFERRED EMBODIMENTS

EXAMPLE 1

A series of batch mixtures were prepared by thoroughly mixing together calcined (MgO) and Transvaal chrome ore (T.C.O.) with amounts of sodium carbonate ($Na_2CO_3$) varying from 0 to 3 weight percent of the total basic refractory raw material. These batch mixtures are set forth in the table below. The calcined magnesia had a typical analysis, by weight of 98% MgO, 1% CaO, 0.4% $SiO_2$ and 0.2% $Fe_2O_3$. Typical analysis, by weight, of Transvaal chrome ore was 44% $Cr_2O_3$, 23% FeO, 13% $Al_2O_3$, 12% MgO, 4% $SiO_2$, 0.5% CaO and 0.4% $TiO_2$.

TABLE I

| Batch Mixture — parts by weight | | | Ave. No. of Hrs. |
|---|---|---|---|
| MgO | T.C.O. | $Na_2CO_3$ | Initial Crack |
| 55 | 45 | 0 | 7 |
| 55 | 45 | 1 | 20 |
| 55 | 45 | 3 | 13.5 |

Two fused cast sample blocks were made from each batch mixture by separately melting and solidifying the mixtures in crucible molds. One portion of each sample block was subjected to a standard accelerated hydration test. The test consisted of immersing the block specimens in boiling water for extended periods of time and periodically observing the block samples for the occurrence of the first or initial crack. At the occurrence of this event, the total number of immersion hours in the boiling water were noted. These data for the two block samples of each batch mixture are given in the table as the average of the time data noted for each pair of samples.

Substitution of potassium carbonate for the sodium carbonate in the foregoing samples will give results of substantially the same character.

The most effective carbonate addition appears to be 1 weight percent $Na_2CO_3$.

Example 2

Additional sample blocks are made as in example 1 except that the sodium carbonate is wholly replaced in each case by one part by weight of one of the following compounds: trisodium phosphate ($Na_3PO_4$), sodium silicate ($Na_2O \cdot SiO_2$) and sodium sulfate ($Na_2SO_4$). When portions of the blocks made with each compound are subjected to the same standard accelerated hydration test in boiling water, the average number of hours for the occurrence of the first or initial crack exceeds 14 hours.

Substitution of the potassium compounds corresponding to the sodium compounds in the foregoing samples of this example will give results of substantially the same character.

We claim:

1. The process of effecting inhibition to hydration cracking and disintegration of fused cast basic refractory articles that are made by preparing a mixture of basic refractory raw materials consisting essentially of magnesia and chrome ore and having an oxide analysis, by weight, of at least 40% MgO, at least 12% $Cr_2O_3$, at least 5% $Al_2O_3$, at least 3% FeO, up to 3% CaO, up to 5% $SiO_2$, up to 10% $TiO_2$, up to 3 percent fluorine, and in which the total of MgO+$Cr_2O_3$+$Al_2O_3$+FeO is at least 82 percent, melting the mixture, pouring the melted mixture into molds and solidifying the melted mixture to form monolithic articles, said process comprising adding to and mixing with said mixture prior to melting it 0.5 to 5 weight percent, based on the total weight of the basic refractory raw materials, of at least one oxygen-containing compound of sodium and potassium.

2. The process of claim 1 wherein said oxygen-containing compound is selected from carbonate, phosphate, silicate and sulfate of sodium and potassium.

3. The process of claim 2 wherein the selected compound is sodium carbonate and in an amount of only 1 to 3 weight percent, based on the total weight of the basic refractory raw materials.

4. The process of claim 3 wherein said oxide analysis, by weight, is 45–60% MgO, 12–25% $Cr_2O_3$, 5–25% $Al_2O_3$, 5–15% FeO, less than 2% CaO, less than 2% $SiO_2$, up to 3% $TiO_2$, up to 1 percent fluorine, and in which the total of MgO+$Cr_2O_3$+$Al_2O_{3av}$+FeO is at least 95 percent.

5. The process of claim 2 wherein said oxide analysis, by weight, is 45–60% MgO, 12–25% $Cr_2O_3$, 5–25% $Al_2O_3$, 5–15% FeO, less than 2% CaO, less than 2% $SiO_2$, up to 3% $TiO_2$, up to 1 percent fluorine, and in which the total of MgO+$Cr_2O_3$+$Al_2O_{3av}$+FeO is at least 95 percent.

6. The process of claim 1 wherein said oxide analysis, by weight, is 45–60% MgO, 12–25% $Cr_2O_3$, 5–25% $Al_2O_3$, 5–15% FeO, less than 2% CaO, less than 2% $SiO_2$, up to 3% $TiO_2$, up to 1 percent fluorine, and in which the total of MgO+$Cr_2O_3$+$Al_2O_{3av}$+FeO is at least 95 percent.

7. The fused cast basic refractory article having inhibition to hydration cracking and disintegration, and made by the process comprising preparing a mixture of basic refractory raw materials consisting essentially of magnesia and chrome ore and having an oxide analysis, by weight, of at least 40% MgO, at least 12% $Cr_2O_3$, at least 5% $Al_2O_3$, at least 3% FeO, up to 3% CaO, up to 5% $SiO_2$, up to 10% $TiO_2$, up to 3% fluorine, and in which the total of MgO+$Cr_2O_3$+$Al_2O_3$+FeO is at least 82 percent, adding to and mixing with said mixture 0.5 to 5 weight percent, based on the total weight of the basic refractory raw materials, of at least one oxygen-containing compound of sodium and potassium, melting the mixture, pouring the melted mixture into molds and solidifying the melted mixture to form monolithic articles.

8. The fused cast basic refractory article having inhibition to hydration cracking and disintegration, and made by the process comprising preparing a mixture of basic refractory raw materials consisting essentially of magnesia and chrome ore and having an oxide analysis, by weight, of 45–60% MgO, 12–25% $Cr_2O_3$, 5–25% $Al_2O_3$, 5–15% FeO, less than 2% CaO, less than 2% $SiO_2$, up to 3% $TiO_2$, up to 1 percent fluorine, and in which the total of MgO+$Cr_2O_3$+$Al_2O_3$+FeO is at least 95 percent, adding to and mixing with said mixture 1–3 weight percent, based on the total weight of the basic refractory raw materials, of sodium carbonate, melting the mixture, pouring the melted mixture into molds and solidifying the melted mixture to form monolithic articles.

* * * * *

UNITED STATES PATENT OFFICE
CERTIFICATE OF CORRECTION

Patent No. 3,620,782      Dated November 16, 1971

Inventor(s) Robert N. McNally and Robert F. Patrick

It is certified that error appears in the above-identified patent and that said Letters Patent are hereby corrected as shown below:

Under Abstract, line 1, change "ikhibiting" to --inhibiting--

Column 2, line 8, change "with" to --which--

Column 2, line 19, change "$Mg.+Cr_2O+Al_2O_3+FeO$" to

--$MgO+Cr_2O_3+Al_2O_3+FeO$--

Column 3, Claim 4, line 27, change "$Al_2O_3ay$" to --$Al_2O_3$--

Column 3, claim 5, line 32, change "$Al_2O_3ay$" to --$Al_2O_3$--

Column 4, claim 6, line 4, change "$Al_2O_3ay$" to --$Al_2O_3$--

Signed and sealed this 23rd day of May 1972.

(SEAL)
Attest:

EDWARD M. FLETCHER, JR.      ROBERT GOTTSCHALK
Attesting Officer      Commissioner of Patents